United States Patent Office 3,336,299
Patented Aug. 15, 1967

3,336,299
PROCESS FOR PREPARING LACTAMS BY OXIDATION OF CYCLIC AMINES
Donald M. Fenton, Anaheim, Calif., assignor to Union Oil Company of California, Los Angeles, Calif., a corporation of California
No Drawing. Filed July 16, 1965, Ser. No. 472,691
3 Claims. (Cl. 260—239.3)

ABSTRACT OF THE DISCLOSURE

The oxidation of heterocyclic amines, e.g., azacycloheptane, piperidine, pyrrolidine and alkyl derivatives thereof with mercuric oxide under mild conditions in liquid phase to prepare lactams useful as monomers in polymer formation.

---

This invention relates to a method for the oxidation of heterocyclic amines to lactams. In particular, this invention relates to the preparation of lactams having the following structure:

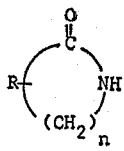

wherein:
R can be hydrogen or alkyl having from 1 to about 12 carbons; and
$n$ is 3 to 5.

The aforementioned lactams have a variety of uses, e.g., as monomers for copolymerization in polymer preparation. Heretofore lactams have been prepared by Beckman rearrangement of alicyclic oximes through a fairly complex route involving several principal reactions, e.g., preparation of an oxime sulfate, rearrangement of the sulfate to an imidyl sulfate and hydrolysis of the latter to the lactam. Numerous proposals have been made to improve the efficiency of this process and to reduce byproduct formation. These proposals, however, do not avoid the necessity for several reactions.

I have now found that lactams can be produced by the direct oxidation of a heterocyclic amine with mercuric oxide under relatively mild conditions of temperature and sufficient pressure to maintain liquid phase conditions. The mercuric oxide is reduced to mercury during the oxidation and the latter is readily separated from the organic products and regenerated for further reuse. In this manner a simple continuous preparation of lactams can be effected.

The reactants can be a seven-membered heterocyclic such as alpha-pyrrolidone and alkyl derivatives thereof having the following structure:

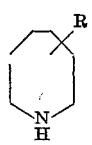

The reactants employed in my reaction can also be piperidine and alkyl piperidines, having the following structure:

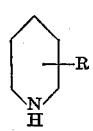

The reactants can also be pyrrolidines and alkyl pyrrolidines having the following structure:

Examples of suitable reactants therefore include azacycloheptane and carbon substituted derivatives thereof such as 4-methylazacycloheptane, 4-isopropylazacycloheptane, etc. Also included are piperidine and carbon substituted piperidines such as methyl piperidine, ethyl piperidine, isopropyl piperidine, butyl piperidine, amyl piperidine, hexyl piperidine, heptyl piperidine, octyl piperidine, nonyl piperidine, lauryl piperidine; pyrrolidine, and carbon substituted pyrrolidines such as methyl pyrrolidine, ethyl pyrrolidine, butyl pyrrolidine, isopropyl pyrrolidine, amyl pyrrolidine, hexyl pyrrolidine, heptyl pyrrolidine, octyl pyrrolidine, decyl pyrrolidine, lauryl pyrrolidine, etc.

The lactams produced in accordance with this invention include caprolactam, the gamma or butyro lactams such as alpha-pyrrolidone and alkyl derivatives thereof as well as the delta-valerolactams, i.e., the alpha-piperidones and alkyl derivatives thereof. These products are produced by the oxidation of the carbon adjacent the nitrogen of the amine with a stoichiometric reduction of 2 mols of mercuric oxide to mercury in accordance with the following reaction:

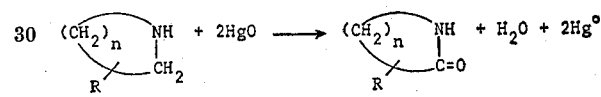

wherein R and $n$ are as aforementioned.

The reaction can be conducted in an excess of the reactant amine, the excess serving as the reaction medium. If desired, however, a stoichiometric quantity of mercuric oxide and amine can be employed to insure complete reaction of the amine. Preferably, however, particularly when a high melting point amine is used, an inert diluent is employed that is liquid at the reaction conditions and inert to the reactants. Examples of suitable organic solvents that can be employed include various ethers such as methyl ethyl ether, diethyl ether, diisoamyl ether, diethylene glycol diethyl ether, triethylene glycol diethyl ether, tetraethylene glycol dimethyl ether, etc.

Various esters can also be employed as a solvent, e.g., methyl acetate, ethyl acetate, isopropyl acetate, ethyl propionate, sec-butyl acetate, isobutyl acetate, ethyl butyrate, butyl acetate, isoamyl acetate, amyl acetate, isoamyl butyrate, ethyl acetylacetate, glycol diacetate, isoamyl isovalerate, methyl benzoate, ethyl benzoate, methyl salicylate, propyl benzoate, dibutyl oxalate, etc.

The saturated hydrocarbons can of course be used as suitable inert solvents, e.g., pentane, hexane, heptane, octane, decane, dodecane, kerosine, naphtha, etc.

The reaction is performed under relatively mild conditions including temperatures from about 25° to 300° C., preferably from about 50° to about 200° C. The pressure employed is not critical in the reaction and generally any pressure from about atmospheric to 10,000 p.s.i.g. can be employed if desired, preferably the pressure employed is that sufficient to maintain the reactants and/or solvents in liquid phase.

The crude product is readily obtained free of metallic mercury by decanting the product from the mercury layer and filtering the decanted liquid. When an inert organic reaction medium is employed, the product can be recovered therefrom in conventional techniques, e.g., distillation, crystallization and filtration, extraction, etc. The mercury layer can be recovered for reuse by simple oxidation techniques to produce mercuric oxide, e.g., contacting of the mercury with oxygen in the presence of a catalytic amount of nitric acid. The solvent after recovery of the desired product can be combined with the mercuric oxide and further amine reactant for use in the process.

The process of my invention will now be illustrated by the following examples:

*Example 1*

To a titanium lined bomb was added 100 milliliters piperidine and 40 grams of yellow mercuric oxide. The bomb was closed and heated to 110° C. and maintained at that temperature for two hours while rocking the bomb to agitate the contents. The bomb was then heated to 200° C. and maintained at that temperature for an additional two hours. The bomb was thereafter cooled and opened and the contents filtered to separate the product from the mercury. The filtrate was distilled to separate unreacted piperidine, water and 7 grams valerolactam, boiling point 80°–82° C. at 2 millimeters mercury, refractive index of 1.4920 at 24° C. and melting point of 42° C. The reaction can simply be practiced with any of the aforementioned heterocyclic amines by the direct substitution of these amines for the piperidine employed in these examples. Equivalent yields of the lactam will be obtained from these amines. In this manner azacycloheptane can be directly oxidized to caprolactam.

*Example 2*

The bomb was charged with 40 grams of yellow mercuric oxide, 80 milliliters of piperidine and 20 milliliters of an inert solvent, n-heptane. The mixture was rocked and heated to 110° C. and maintained at that temperature for two hours and then heated to 200° C. and maintained at that temperature for two hours. The bomb was cooled, opened and the liquid contents processed to recover 4 grams of valerolactam.

The preceding examples are intended solely to illustrate a mode of practicing my invention and to demonstrate results obtainable thereby. It is not intended that these examples be unduly limiting of the invention which is intended to be defined by the method steps and their obvious equivalents set forth in the following claims:

I claim:

1. The manufacture of lactams that comprises contacting a heterocyclic amine having the following structure:

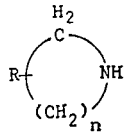

wherein:

R is selected from the class consisting of hydrogen and alkyl having from 1 to about 12 carbons; and $n$ is 3 to 5 with mercuric oxide at a temperature from about 25° to 300° C. and a pressure from about atmospheric to 10,000 p.s.i.g. sufficient to maintain liquid phase conditions.

2. The oxidation of piperidine to valerolactam that comprises contacting said piperidine with mercuric oxide at a temperature from about 25° to 300° C. and sufficient pressure to maintain liquid phase conditions.

3. The preparation of caprolactam that comprises contacting azacycloheptane with mercuric oxide at a temperature between about 25° and 300° C. and sufficient pressure to maintain liquid phase conditions.

No references cited.

WALTER A. MODANCE, *Primary Examiner.*

ROBERT T. BOND, *Assistant Examiner.*